May 25, 1943.  R. R. WILSON  2,320,317
VINE CUTTING MECHANISM
Filed May 29, 1942
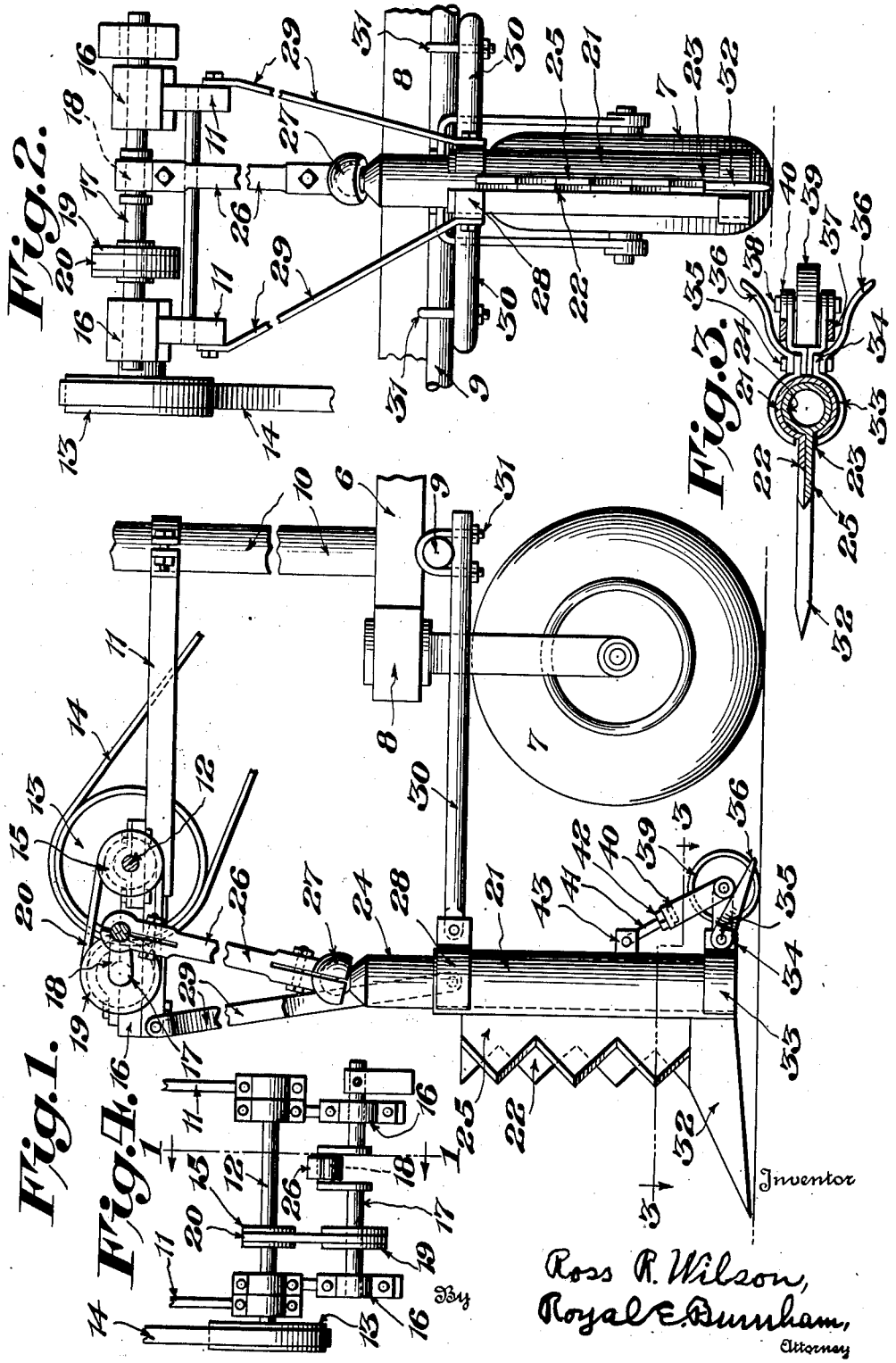
Inventor
Ross R. Wilson,
Royal E. Burnham,
Attorney Patented May 25, 1943

2,320,317

UNITED STATES PATENT OFFICE 2,320,317

VINE CUTTING MECHANISM

Ross R. Wilson, Billings, Mont.

Application May 29, 1942, Serial No. 445,050

2 Claims. (Cl. 56—247)

This invention relates to mechanism for cutting bean, pea, and other tangled vines, and particularly for cutting and loosening entwined masses of vegetation lying on the ground so that it may be harvested or more easily turned into the soil by plows.

It is an object of the invention to provide an improved cutter mechanism that is efficient in action in masses of legumes and similar growths.

Another object is to provide means whereby the cutter mechanism may be adjusted with respect to the ground, so that it may be positioned lower or higher as conditions may require.

Further, it is an object so to house the reciprocable sickle carrying bar of a cutter mechanism that it is not liable to be clogged by vines.

The cutter mechanism is adapted to be mounted on the front of a tractor or other suitable power-driven machine or vehicle and to be driven by the propelling engine of the latter or by another engine thereon.

The invention provides drive means for the cutter mechanism so associated with a tractor or other vehicle that that mechanism may be moved upwardly and downwardly for its adjustment, in response to difference of ground level between it and the vehicle wheels, and for raising it for transportation and returning it to operative position.

When considered with the description herein, characteristics of the invention are apparent in the accompanying drawing, forming part hereof, wherein an embodiment is disclosed for purpose of explanation.

Like reference-characters refer to corresponding parts in the views of the drawing, of which—

Fig. 1 is a side elevation, partly in section on line 1—1, Fig. 4;

Fig. 2 is a front elevation;

Fig. 3 is a section on line 3—3, Fig. 1;

Fig. 4 is a plan view.

The cutter bar and its drive mechanism are mounted on a frame secured to and extending forwardly from the vehicle. Only the frame parts necessary for disclosure of the invention are shown. They are a longitudinal beam 6, which is supported at its front by a ground wheel 7; a transverse beam 8; a transverse bar 9 carried by the transverse beam; upright members 10 carried by the beam, and longitudinal members 11 carried by and extending forwardly from the members 10.

A transverse shaft 12 is rotatably mounted on the members 11, and it has fast thereon a pulley or wheel 13 driven through a belt 14 by an engine on the vehicle, and also a pulley or wheel 15 by which the cutter mechanism is driven.

Two longitudinal members 16 are swingably mounted on and extend forwardly from the shaft 12, and in their front portions they carry a rotary transverse shaft 17 having a crank 18. The crank shaft has a pulley or wheel 19 fast thereon, which is driven by a pulley or wheel 15 through a belt 20.

The cutter mechanism comprises an upright hollow cylinder 21. An upright cutter blade 22, on the front of the cylinder and extending forwardly therefrom, is fixed thereto by being formed integrally therewith, by welding, or in any other suitable manner. The cylinder has a longitudinal slot 23 at a side of and coextensive with the fixed cutter blade.

A cylindrical bar 24 fits closely and is reciprocable in the cylinder 21, and it is entirely housed therein except for its upper portion. The inner bar 24 carries a sickle blade 25 that extends through the slot 23 and contacts the side of and cooperates with the fixed blade 22.

The inner bar 24 is reciprocated by a pitman 26, the pitman being connected by a ball-and-socket joint 27 at one end of the bar and being journaled at the other end on the crank 18.

A collar 28 is fixed to the upper portion of the outer cylinder 21. The collar is connected with the longitudinal members 16 by struts 29, which take the thrusts of the pitman. Struts 30 are connected at their rear ends to the transverse bar 9 by U-clamps 31 and at their front ends to the collar 28.

A shoe 32, to raise vines to the cutter blades, is mounted on the lower end of the cutter mechanism in any suitable manner, as by welding to the cylinder 21.

In order to maintain the lower end of the cutter mechanism at the desired distance from the ground, the following parts are provided:

A collar 33 fixed to the lower end of the cylinder 21, and having rearwardly extending ears 34 carrying a shaft or bolt 35, on which rearwardly extending outwardly flaring guards 36 are mounted outside of the ears.

A yoke 37 pivoted at its front on the bolt between the ears 34, extending rearwardly therefrom, and carrying a shaft 38 at its rear end, and a ground wheel 39 journaled on the shaft between members of the yoke, the wheel being positioned between the guards 36.

A strut comprising a member 40 of inverted U-shape and with the shaft 38 disposed therethrough, and a rod 41 having its lower end threaded and connected to the upper end of the member 40 by opposed nuts 42 and its upper end pivotally connected to an ear 43 fixed to the cylinder 21.

The height above the ground of the lower end of the cutter mechanism may be altered in an obvious manner by turning the nuts 42 on the rod 41.

Cutting mechanism formed and mounted as described is very efficient in operation in masses of entwined bean, pea, and other vines and similar growths.

While the mechanism is driven and advanced by the vehicle on the front of which it is mounted, the shoe raises the vine mass from the ground to the cutter blades, so that the lower layer of the mass is brought to them and both that layer and the vines above it are cut through.

As the inner reciprocable cutter bar is entirely housed, except at its upper end, in the outer protecting cylinder, the bar is not liable to be clogged by vines.

The floating drive mechanism enables the cutter mechanism to rise and fall in accordance with the travel of the ground wheel 39, and also to be raised, by any suitable means, for transportation.

I claim:

1. Mechanism of the class described comprising an upright outer hollow bar having a longitudinal slot, a cutter blade fixed on said bar adjacent to said slot and extending outwardly therefrom, an inner bar housed and reciprocable in said outer bar, a sickle blade fixed to said inner bar and extending outwardly through said slot adjacent to said cutter blade, a fixed support, members mounted to swing upwardly and downwardly on said support, a crank shaft journaled on said members, a pitman operatively connected with said crank shaft and said inner bar, struts connecting said members and said outer bar, and drive means for said crank shaft.

2. Mechanism of the class described comprising an outer hollow bar having a longitudinal slot, a cutter blade fixed on said bar adjacent to said slot, an inner bar reciprocable in said outer bar, a sickle blade fast to said inner bar and extending outwardly through said slot adjacent to said cutter blade, a drive shaft mounted on a fixed support, members swingably mounted on said drive shaft, a crank shaft journaled on said members, drive means operatively associated with said drive and crank shafts, a pitman operatively connected with said crank shaft and said inner bar, and struts connecting said members and said outer bar.

ROSS R. WILSON.